United States Patent
Ogle et al.

(10) Patent No.: US 9,027,644 B2
(45) Date of Patent: *May 12, 2015

(54) OLIGOMERIC AND POLYMERIC ELECTRONICALLY-MODIFIED BORONIC ACIDS AND METHODS OF USING THE SAME

(71) Applicant: Halliburton Energy Services, Inc., Houston, TX (US)

(72) Inventors: James William Ogle, Houston, TX (US); Jeremy Holtsclaw, Houston, TX (US); David Loveless, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/189,455

(22) Filed: Feb. 25, 2014

(65) Prior Publication Data

US 2014/0174748 A1     Jun. 26, 2014

Related U.S. Application Data

(63) Continuation of application No. 13/659,421, filed on Oct. 24, 2012.

(51) Int. Cl.
| | | |
|---|---|---|
| *E21B 33/138* | (2006.01) | |
| *E21B 43/26* | (2006.01) | |
| *C09K 8/62* | (2006.01) | |
| *C09K 8/12* | (2006.01) | |
| *C09K 8/68* | (2006.01) | |
| C09K 17/40 | (2006.01) | |
| C09K 8/74 | (2006.01) | |

(52) U.S. Cl.
CPC ............... *E21B 43/26* (2013.01); *C09K 17/40* (2013.01); *E21B 33/138* (2013.01); *C09K 8/74* (2013.01); *C09K 8/62* (2013.01); *C09K 8/12* (2013.01); *C09K 8/68* (2013.01)

(58) Field of Classification Search
CPC .......... C09K 8/685; C09K 17/40; C09K 8/74; E21B 33/138; E21B 43/26
See application file for complete search history.

(56) References Cited

U.S. PATENT DOCUMENTS

| | | | |
|---|---|---|---|
| 2,703,316 A | 3/1955 | Schneider et al. | |
| 3,912,692 A | 10/1975 | Casey et al. | |
| 4,387,769 A | 6/1983 | Erbstoesser et al. | |
| 5,216,050 A | 6/1993 | Sinclair | |
| 5,373,901 A | 12/1994 | Norman et al. | |
| 6,323,307 B1 | 11/2001 | Bigg et al. | |
| 6,444,316 B1 | 9/2002 | Reddy et al. | |
| 6,488,091 B1 | 12/2002 | Weaver et al. | |
| 6,527,051 B1 | 3/2003 | Reddy et al. | |
| 6,554,071 B1 | 4/2003 | Reddy et al. | |
| 7,000,702 B2 | 2/2006 | Hanes, Jr. et al. | |
| 7,082,995 B2 | 8/2006 | Hanes, Jr. et al. | |
| 8,424,603 B2 * | 4/2013 | Loveless et al. | 166/300 |
| 8,708,045 B2 * | 4/2014 | Ogle et al. | 166/300 |
| 2006/0003900 A1 * | 1/2006 | Hanes, Jr. | 507/203 |
| 2006/0089265 A1 * | 4/2006 | Hanes et al. | 507/203 |
| 2014/0110120 A1 | 4/2014 | Ogle et al. | |

FOREIGN PATENT DOCUMENTS

WO       2014066248 A1     5/2014

* cited by examiner

*Primary Examiner* — Zakiya W Bates
(74) *Attorney, Agent, or Firm* — McDermott Will & Emery LLP; Craig W. Roddy (57) ABSTRACT

Crosslinked gelling agents employed during subterranean operations use electronically-modified boronic acids to enable higher operating temperatures while allowing reduced gelling agent loadings; the boronic acids having Formula I:

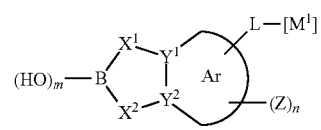

$X^1$ and $X^2$ are independently selected from O, $CH_2$, $CH_2O$, $OCH_2$, bond, and null, $Y^1$ and $Y^2$ are independently N or C, Ar is a 5- or 6-membered ring aryl or heteroaryl group with a link L to monomer unit $M^1$, m is 1 or 2, n is 0, 1, 2, or 3, and each Z is independently an electron withdrawing group selected from nitro, ester, carboxylic acids, carboxylates, halogen, cyano, amide, acyl, alkylsulfonyl, arylsulfonyl, heteroarylsulfonyl, $CF_3$, a quaternary ammonium salt, polyhaloalkyl, and carbamate, with the proviso that when n is 0, the link L between $M^1$ and Ar includes an electron withdrawing group attached to Ar, and introducing the treatment fluids into subterranean formations.

17 Claims, 2 Drawing Sheets

OLIGOMERIC AND POLYMERIC ELECTRONICALLY-MODIFIED BORONIC ACIDS AND METHODS OF USING THE SAME

BACKGROUND

The present invention relates to crosslinked gelling agents employed in treatment fluids during subterranean operations, and more particularly, to the use of oligomeric and polymeric electronically-modified boronic acids to provide crosslinked gelling agents that are stable at high operating temperatures while allowing reduced gelling agent loadings.

Figure 1:
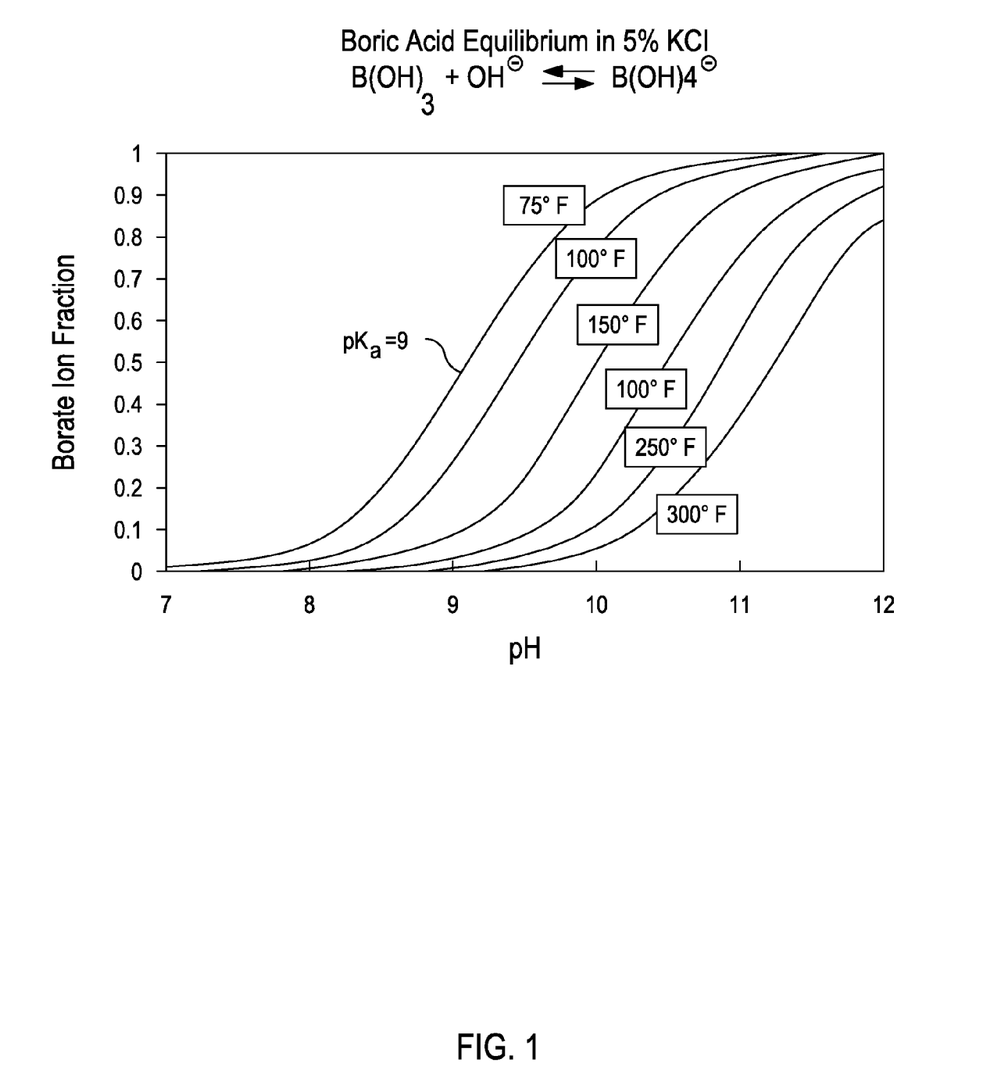
FIG. 1 is a plot showing a borate ion fraction as a function of pH and temperature.
Figure 2:
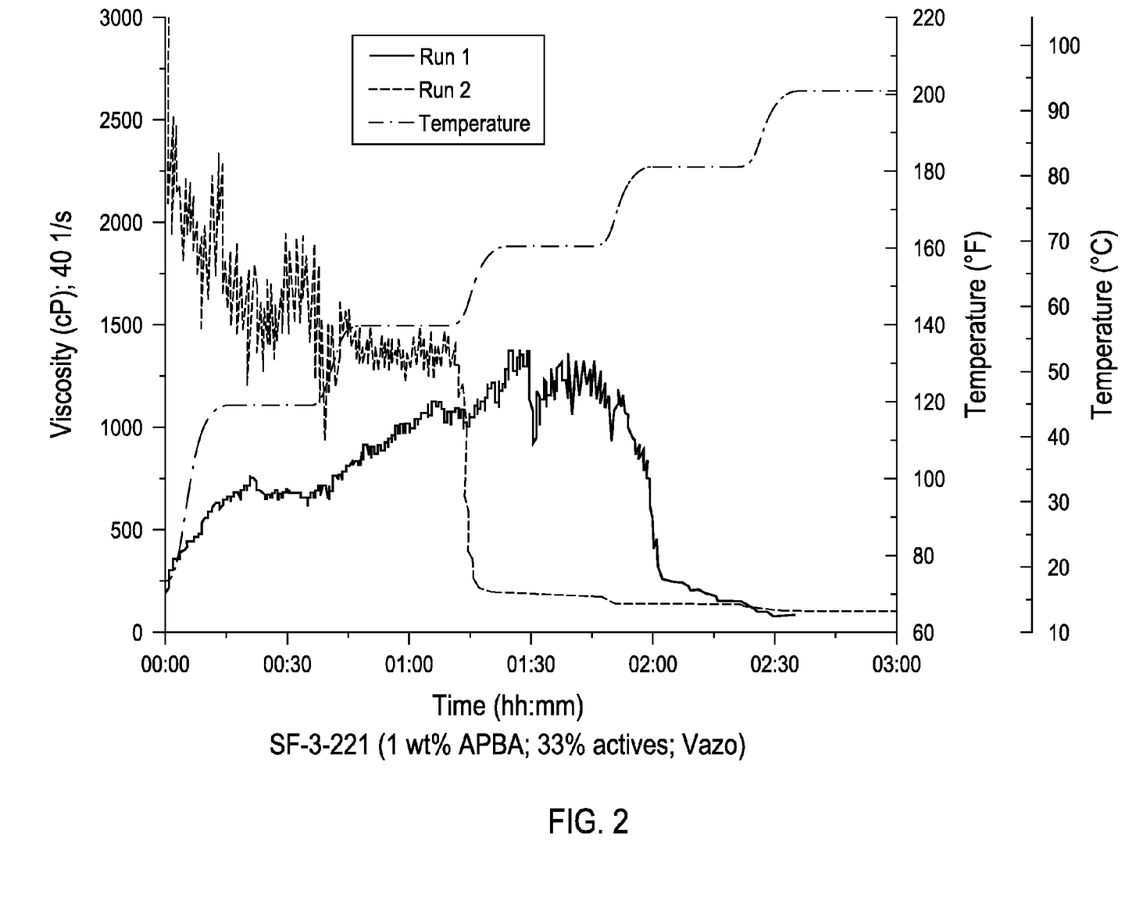
FIG. 2 is a plot of viscosity as a function of time and temperature of a copolymer containing boronic acid-containing crosslinking monomers and acrylamide monomers, the copolymer crosslinking guar.

In treatment fluids that use boron-based reagents to produce crosslinked gelling agents, such as crosslinked guar, there is typically interplay between the nature of boron crosslinking, the pH, and temperature. This relationship is indicated, for example, in FIG. 1, for the prototypical boron crosslinker boric acid. The chemical reaction between crosslinked boron and non-crosslinked boron is considered to be reversible with a fairly low barrier to crosslinking and de-crosslinking. At room temperature and at reasonably high pH (around 8.5) crosslinking is favored. As temperature increases, the barrier of activation energy between the crosslinked and non-crosslinked material becomes insignificant relative to the energy of the system, and the gel de-crosslinks to form linear polymers that may or may not have boron bound intramolecularly. This can be demonstrated experimentally, as shown in FIG. 2, by plotting viscosity as a function of temperature. Notably, when this exemplary boronic acid-acrylamide-based gel de-crosslinks in run 1 the temperature of de-crosslinking is 180° F. Subjecting the same material to the same temperature ramp a second time (run 2) causes the gel to de-crosslink at a lower temperature 160° F., indicating possible irreversible chemical alteration of the polymer system during run 1.

These linear polymers are not desirable in fracturing operations where the use of such crosslinked gels in treatment fluids is common. Hydraulic fracturing techniques are widely used to enhance oil and gas production from subterranean formations. During hydraulic fracturing, a fluid is injected into a well bore under high pressure. Once the natural reservoir fracture gradient is exceeded, the fracturing fluid initiates a fracture in the formation that generally continues to grow during pumping. The operation generally requires the fluid to reach a maximum viscosity as it enters the fracture affecting both the fracture length and width. Among the issues that arise with linear polymers is that they do not have the necessary viscosity for proper proppant transport at elevated temperature.

While boron-based crosslinking agents may be effective for many types of fracturing fluids, a certain amount of the gelling agent is needed to achieve the viscosity necessary to fracture the formation and support transport of the proppant. However, it is generally desirable to use as little gelling agent as possible in a fracturing fluid so that the overall cost of the fracturing job is lower and less polymer residue remains in the fracture and the proppant pack after breaking down the crosslinked gel. In this regard, use of less gelling agent can help minimize formation damage.

Recent advances in reducing the amounts of gelling agents include the use of boronate-functionalized polymers that may exhibit similar energies of activation (Ea) as the boric acid prototype. However, boronate-functionalized polymers typically dissociate into independent linear polymers at lower temperatures. For example, a typical borate gel may be held stable for several hours at 250° F. and a pH of about 11, while boronate-functionalized polymers may dissociate into linear polymers at temperatures of only about 180° F., well below a desirable operational temperature for certain applications.

Other issues that may arise with boron-based crosslinking systems relates to compatibility with calcium ion. There has been an increasing demand to use $CaCl_2$ brines in offshore operations. This is due, at least in part, to the fact that $CaCl_2$ brines are less expensive than other brines. However, current boron crosslinking processes are not compatible with such brines. In particular, the elevated pH employed in boron crosslinking can cause calcium precipitation.

SUMMARY OF THE INVENTION

The present invention relates to crosslinked gelling agents employed in treatment fluids during subterranean operations, and more particularly, to the use of oligomeric and polymeric electronically-modified boronic acids to provide crosslinked gelling agents that are stable at high operating temperatures while allowing reduced gelling agent loadings.

In some embodiments, the present invention provides methods comprising providing treatment fluids that comprise aqueous base fluids, gelling agents, and oligomers or polymers comprising monomer units $M^1$ comprising boronic acids, and optional comonomers, wherein the boronic acids comprise structures of Formula I:

wherein $X^1$ and $X^2$ are independently selected from the group consisting of O, $CH_2$, $CH_2O$, $OCH_2$, bond, and null, $Y^1$ and $Y^2$ are independently N or C, Ar is a 5- or 6-membered ring aryl or heteroaryl group with a link L to monomer unit $M^1$, m is 1 or 2, n is 0, 1, 2, or 3, and each incidence of Z is independently an electron withdrawing group selected from the group consisting of nitro, ester, carboxylic acids, carboxylates, halogen, cyano, amide, acyl, alkylsulfonyl, arylsulfonyl, heteroarylsulfonyl, $CF_3$, a quaternary ammonium salt, polyhaloalkyl, and carbamate, with the proviso that when n is 0, the link L between $M^1$ and Ar comprises an electron withdrawing group attached to Ar, and the methods comprising introducing the treatment fluids into subterranean formations.

In other embodiments, the present invention provides methods comprising providing treatment fluids that comprise aqueous base fluids, gelling agents, and oligomers or polymers comprising monomer units $M^1$ comprising boronic acids, and optional comonomers, wherein the boronic acids comprise structures of Formula I:

wherein $X^1$ and $X^2$ are independently selected from the group consisting of O, $CH_2$, $CH_2O$, $OCH_2$, bond, and null, $Y^1$ and $Y^2$ are independently N or C, Ar is a 5- or 6-membered ring aryl or heteroaryl group with a link L to monomer unit $M^1$, m is 1 or 2, n is 0, 1, 2, or 3, and each incidence of Z is independently an electron withdrawing group selected from the group consisting of nitro, ester, carboxylic acids, carboxylates, halogen, cyano, amide, acyl, alkylsulfonyl, arylsulfonyl, heteroarylsulfonyl, CF$_3$, a quaternary ammonium salt, polyhaloalkyl, and carbamate, with the proviso that when n is 0, the link L between M$^1$ and Ar comprises an electron withdrawing group attached to Ar, and the methods comprising introducing the treatment fluid into a subterranean formation at a pressure sufficient to create or enhance at least one fracture therein.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present invention relates to crosslinked gelling agents employed in treatment fluids during subterranean operations, and more particularly, to the use of oligomeric and polymeric electronically-modified boronic acids to provide crosslinked gelling agents that are stable at high operating temperatures while allowing reduced gelling agent loadings.

Of the numerous advantages, the present invention provides treatment fluids that comprise oligomeric and polymeric electronically-modified boronic acids crosslinked with various polyhydroxylated gelling agents to provide crosslinked gelling agents that can operate at high temperatures in various subterranean operations, such as fracturing operations. For example, the oligomeric and polymeric electronically-modified boronic acids disclosed herein may serve as crosslinkers for gelling agents to provide a crosslinked gel that is stable at temperatures in a range from about 180° C. to about 300° C. Moreover, the crosslinked gelling agents employing oligomeric and polymeric electronically-modified boronic acids as the crosslinker may allow a reduction in the amount of formation-damaging gelling agent employed, thus providing a treatment fluid that is environmentally sound. Finally, the crosslinked gelling agents employing oligomeric and polymeric electronically-modified boronic acids disclosed herein may be compatible with the presence of high calcium ion concentrations.

The methods and compositions of the present invention may be useful in a variety of applications in which it desirable to increase the viscosity of a fluid. Examples include, without limitation, treatment fluids used in subterranean applications, such as drilling fluids, fracturing fluids, gravel packing fluids and viscous sweeps. Although many of the embodiments of the present invention will be discussed in the context of subterranean operations, such discussion is only intended to illustrate some applications of the oligomeric and polymeric electronically-modified boronic acids disclosed herein. Other advantages and uses will be recognized by those skilled in the art.

In some embodiments, the present invention provides methods comprising providing treatment fluids that comprise aqueous base fluids, gelling agents, and oligomers or polymers comprising monomer units M$^1$ comprising boronic acids, and optional comonomers, wherein the boronic acids comprise structures of Formula I:

wherein X$^1$ and X$^2$ are independently selected from the group consisting of O, CH$_2$, CH$_2$O, OCH$_2$, bond, and null, Y$^1$ and Y$^2$ are independently N or C, Ar is a 5- or 6-membered ring aryl or heteroaryl group with a link L to monomer unit M$^1$, m is 1 or 2, n is 0, 1, 2, or 3, and each incidence of Z is independently an electron withdrawing group selected from the group consisting of nitro, ester, carboxylic acids, carboxylates, halogen, cyano, amide, acyl, alkylsulfonyl, arylsulfonyl, heteroarylsulfonyl, CF$_3$, a quaternary ammonium salt, polyhaloalkyl, and carbamate, with the proviso that when n is 0, the link L between M$^1$ and Ar comprises an electron withdrawing group attached to Ar, and the methods comprising introducing the treatment fluids into subterranean formations.

The aqueous base fluid of the treatment fluids of the present invention may comprise fresh water, saltwater (e.g., water containing one or more salts dissolved therein), brine (e.g., saturated salt water), seawater, a weighted brine (e.g., calcium bromide, sodium bromide), or any combination thereof. The aqueous fluid can be from any source. In general, the aqueous fluid should not contain an excess of compounds that can adversely affect the desired properties of the treatment fluid.

The present invention provides oligomers or polymers comprising monomer units M$^1$ comprising boronic acids as crosslinkers capable of crosslinking two or more molecules, e.g., two or more gelling agent molecules. The term "crosslink(s)" or "crosslinking" refers to a connecting unit between neighboring chains of atoms in a complex chemical molecule, e.g., a polymer. In some embodiments, the oligomers or polymers comprising monomer units M$^1$ comprising boronic acids of the present invention comprise a polymeric backbone with a boronic functional group attached at one or more points along the polymer chain. Boronic functional groups suitable for use in the oligomers or polymers comprising monomer units M$^1$ comprising boronic acid that function as crosslinkers of the present invention may comprise any boronic functional group including, but not limited to, a boronic acid group having at least one OH group bound to boron (e.g., R$_2$—B—OH or R—B(OH)$_2$). It will be understood by the skilled artisan that a boronic acid is also a Lewis acid capable of accepting a lone pair electron donor (Lewis base) such as hydroxide (OH$^-$) and that reaction at sufficiently high pH may provide boron in a borate form (e.g., R$_2$—B—(OH)$_2^-$ or R—B(OH)$_3^-$).

With reference to Formula I, it will be understood by the skilled artisan that X$^1$ and X$^2$ may not both be null since such a motif results in boron not being linked by a bond, an atom, or group of atoms to the Ar group.

The term "acyl," alone or in combination, refers to a carbonyl attached to an alkenyl, alkyl, aryl, cycloalkyl, heteroaryl, heterocycle, or any other moiety where the atom attached to the carbonyl is carbon. Examples of acyl groups include formyl, alkanoyl, such as acetyl, propanoyl, and butanoyl, and aroyl, such as benzoyl any of which may be optionally substituted. In some such embodiments, optional substitution may include further electron withdrawing groups such as halogen, nitro, cyano and the like.

The term "alkyl," alone or in combination, refers to a straight-chain or branched-chain alkyl group containing from 1 to 20 carbon atoms. In some embodiments, the alkyl group may comprise from 1 to 10 carbon atoms. In further embodiments, the alkyl group may comprise from 1 to 6 carbon atoms. Alkyl groups may be optionally substituted as defined herein. Examples of alkyl groups include methyl, ethyl, n-propyl, isopropyl, n-butyl, isobutyl, sec-butyl, tert-butyl, pentyl, iso-amyl, hexyl, octyl, noyl and the like. The term "alkylene," alone or in combination, refers to a saturated aliphatic group derived from a straight or branched chain saturated hydrocarbon attached at two or more positions, such as methylene (—$CH_2$—). Unless otherwise specified, the term "alkyl" may include "alkylene" groups.

The terms "amide" or "carbamate," alone or in combination, may refer to an amino group attached to the parent molecular moiety through a carbonyl group, or vice versa. In particular, the term "carbamate," as used herein, alone or in combination, refers to an ester of carbamic acid (—NHCOO—) which may be attached to the parent molecular moiety from either the nitrogen or acid end, and which may be optionally substituted, as defined herein.

The term "aryl," alone or in combination, may refer to a carbocyclic aromatic system containing one, two or three rings wherein such polycyclic ring systems are fused together. The term "aryl" may embrace aromatic groups such as phenyl, naphthyl, anthracenyl, and phenanthryl. In some embodiments, an aryl group may be particularly single 6-membered rings such as phenyl and optionally substituted phenyl rings.

The term "carboxylic acid" or "carboxy," may refer to —C(O)OH or the corresponding "carboxylate" anion, such as is in a carboxylic acid salt. An "O-carboxy" group may refer to a RC(O)O— group, where R is as defined herein. A "C-carboxy" group may to a—C(O)OR groups where R is as defined herein.

The term "cyano," alone or in combination, may refer to —CN.

The term "halo," or "halogen," alone or in combination, may refer to fluorine, chlorine, bromine, or iodine.

The term "heteroaryl," alone or in combination, may refer to a 3 to 7 membered unsaturated heteromonocyclic ring, or a fused monocyclic, bicyclic, or tricyclic ring system in which at least one of the fused rings is aromatic, which contains at least one atom selected from the group consisting of O, S, and N. In some such embodiments, the heteroaryl may comprise from 2 to 5 carbon atoms. The term also embraces fused polycyclic groups wherein heterocyclic rings are fused with aryl rings, wherein heteroaryl rings are fused with other heteroaryl rings, wherein heteroaryl rings are fused with heterocycloalkyl rings, or wherein heteroaryl rings are fused with cycloalkyl rings. Examples of heteroaryl groups include pyrrolyl, pyrrolinyl, imidazolyl, pyrazolyl, pyridyl, pyrimidinyl, pyrazinyl, pyridazinyl, triazolyl, pyranyl, furyl, thienyl, oxazolyl, isoxazolyl, oxadiazolyl, thiazolyl, thiadiazolyl, isothiazolyl, indolyl, isoindolyl, indolizinyl, benzimidazolyl, quinolyl, isoquinolyl, quinoxalinyl, quinazolinyl, indazolyl, benzotriazolyl, benzodioxolyl, benzopyranyl, benzoxazolyl, benzoxadiazolyl, benzothiazolyl, benzothiadiazolyl, benzofuryl, benzothienyl, chromonyl, coumarinyl, benzopyranyl, tetrahydroquinolinyl, tetrazolopyridazinyl, tetrahydroisoquinolinyl, thienopyridinyl, furopyridinyl, pyrrolopyridinyl and the like. Exemplary tricyclic heterocyclic groups include carbazolyl, benzidolyl, phenanthrolinyl, dibenzofuranyl, acridinyl, phenanthridinyl, xanthenyl and the like.

The term "nitro," alone or in combination, refers to —$NO_2$.

The term "sulfonyl," alone or in combination, refers to —$S(O)_2$—. Exemplary sulfonyl groups include alkylsulfonyl, arylsulfonyl, and heteroarylsulfonyl, wherein alkyl, aryl, and heteroaryl are as defined herein.

Any definition herein may be used in combination with any other definition to describe a composite structural group. By convention, the trailing element of any such definition may be that which attaches to the parent moiety. For example, the composite group "alkylamido" would represent an alkyl group attached to the parent molecule through an amido group.

When a group is defined as "null," it is intended to mean the atom, group of atoms or bond is absent.

The term "optionally substituted" may be used to refer to the anteceding group that may be substituted or unsubstituted. When substituted, the substituents of an "optionally substituted" group may include, without limitation, one or more substituents independently selected from the following groups or a particular designated set of groups, alone or in combination: alkyl, lower alkenyl, alkynyl, alkanoyl, heteroalkyl, heterocycloalkyl, haloalkyl, haloalkenyl, haloalkynyl, perhaloalkyl, perhaloalkoxy, cycloalkyl, phenyl, aryl, aryloxy, alkoxy, haloalkoxy, oxo, acyloxy, carbonyl, carboxyl, alkylcarbonyl, carboxyester, carboxamido, cyano, hydrogen, halogen, hydroxy, amino, alkylamino, arylamino, amido, nitro, thiol, lower alkylthio, haloalkylthio, perhaloalkylthio, arylthio, sulfonate, sulfonic acid, trisubstituted silyl, $C(O)CH_3$, $CO_2CH_3$, $CO_2H$, pyridinyl, thiophene, furanyl, carbamate, and urea. Two substituents may be joined together to form a fused five-, six-, or seven-membered carbocyclic or heterocyclic ring consisting of zero to three heteroatoms, for example forming methylenedioxy or ethylenedioxy. An optionally substituted group may be unsubstituted (e.g., —$CH_2CH_3$), fully substituted (e.g., —$CF_2CF_3$), monosubstituted (e.g., —$CH_2CH_2F$) or substituted at a level anywhere in-between fully substituted and monosubstituted (e.g., —$CH_2CF_3$). Where substituents are recited without qualification as to substitution, both substituted and unsubstituted forms may be encompassed.

The term "bond" may refer to a covalent linkage between two atoms, or two moieties when the atoms joined by the bond are considered to be part of larger substructure. A bond may be single, double, or triple unless otherwise specified. In some such embodiments, the bond may be specifically a single bond.

The term R, appearing by itself and without a number designation, as used in the above definitions, refers to a moiety selected from the group consisting of hydrogen, alkyl, cycloalkyl, heteroalkyl, aryl, heteroaryl and heterocycloalkyl, any of which may be optionally substituted. Such R and R' groups should be understood to be optionally substituted as defined herein. Whether an R group has a number designation or not, every R group, including R, and R", where n=(1, 2, 3, ... n), every substituent, and every term should be understood to be independent of every other in terms of selection from a group. Should any variable, substituent, or term (e.g. aryl, heterocycle, R, etc.) occur more than one time in a formula or generic structure, its definition at each occurrence is independent of the definition at every other occurrence.

Those of skill in the art will further recognize that certain groups may be attached to a parent molecule or may occupy a position in a chain of elements from either end as written. Thus, by way of example only, an unsymmetrical group such as —C(O)N(R)— may be attached to the parent moiety at either the carbon or the nitrogen.

The term "electron withdrawing group," provided as substituent "Z" in Formula I, may refer to any of the groups recited above or any other group understood by those skilled in the art to possess inductive and/or resonance electron withdrawing effects on the substituent to which it is attached. In particular, a competent electron withdrawing group, in accordance with embodiments disclosed herein, may be any group which exerts an electronic influence on the pendant boron atom such that crosslinking with a gelling agent is stabilized, i.e. de-crosslinking and the formation of linear polymers is reduced or prevented at target temperatures for conducting subterranean operations, for example from about 180° C. to about 300° C.

In some embodiments, link L may a linker and may represent a bond, a linking atom, or array of atoms connecting Ar to $M^1$. Linking atoms may include, without limitation, carbon, nitrogen, oxygen, and sulfur, each of which has its valency filled through bonding to other atoms or via lone pair electrons. For example, a linking carbon atom may include, without limitation, a methlyene ($CH_2$) or substituted methylene (e.g. $CF_2$) group. A linking sulfur atom may include, without limitation, sulfur, or any oxidized sulfur, such as —SO—, —$SO_2$—, —$SO_3$—, and so on. Similarly, linking nitrogen atoms may comprise N-alkyl and N-acyl substituted amines. Linkers comprising an array of atoms may be of any type commonly employed in the art of solid phase synthesis. Linkers that comprise an array of atoms connecting Ar to $M^1$ may include, without limitation, $C_2$-$C_6$ alkylenes, oligomers, such as peptides, polyethylene glycols, propylene glycols, and the like. Examples of linkers may be any found in, for example, "Linker Strategies in Solid-Phase Organic Synthesis," Peter H. Scott editor, John Wiley & Sons, Inc., Somerset, N.J., December 2009.

Monomer unit $M^1$ may comprise any monomer unit that can be polymerized under standard polymerization conditions including, for example, free-radical polymerization to provide an oligomeric or polymeric backbone. In some embodiments, the monomer unit may be based on an ethylene or substituted ethylene, including acrylates, acrylamides, styrenes, and the like. In some embodiments, the resultant polymer may be hydrophobic. Hydrophobic polymers may include any degree of crosslinking, but generally lack the presence of substantial numbers of heteroatoms that confer polar character to the polymer. The term "hydrophobic polymer" is used herein to mean any polymer resistant to wetting (or not readily wet) by water; that is, having a lack of affinity for water. Examples of hydrophobic polymers may include, without limitation, polyolefins, such as polyethylene, poly(isobutene), poly(isoprene), poly(4-methyl-1-pentene), polypropylene, ethylene-propylene copolymers, ethylene-propylene-hexadiene copolymers, and ethylene-vinyl acetate copolymers; metallocene polyolefins, such as ethylene-butene copolymers and ethylene-octene copolymers; styrene polymers, such as poly(styrene), poly(2-methylstyrene), and styrene-acrylonitrile copolymers having less than about 20 mole-percent acrylonitrile; vinyl polymers, such as poly(vinyl butyrate), poly(vinyl decanoate), poly(vinyl dodecanoate), poly(vinyl hexadecanoate), poly(vinyl hexanoate), poly(vinyl octanoate), and poly(methacrylonitrile); acrylic polymers, such as poly(n-butyl acetate), and poly(ethyl acrylate); methacrylic polymers, such as poly(benzyl methacrylate), poly(n-butyl methacrylate), poly(isobutyl methacrylate), poly(t-butyl methacrylate), poly(t-butylaminoethyl methacrylate), poly(do-decyl methacrylate), poly(ethyl methacrylate), poly(2-ethylhexyl methacrylate), poly(n-hexyl methacrylate), poly(phenyl methacrylate), poly(n-propyl methacrylate), and poly(octadecyl methacrylate); polyesters, such a poly(ethylene terephthalate) and poly(butylene terephthalate); and polyalkenes and polyalkynes, such as polybutylene and polyacetylene.

The term "polyolefin" is used herein to mean a polymer prepared by the addition polymerization of one or more unsaturated monomers that contain only carbon and hydrogen atoms. Examples of such polyolefins may include, without limitation, polyethylene, polypropylene, poly(1-butene), poly(2-butene), poly(1-pentene), poly(2-pentene), poly(3-methyl-1-pentene), poly(4-methyl-1-pentene), and the like. In addition, such term is meant to include blends of two or more polyolefins and random and block copolymers prepared from two or more different unsaturated monomers.

In some embodiments, methods of the invention employ hydrophobic polymers that are superhydrophobic. In some such embodiments, the hydrophobic polymer may include fluorinated polyolefins and other perfluoroalkyl polymers and perfluoropolyethers.

In some embodiments, where the treatment fluid employed in methods of the invention are aqueous based, the polymer may be hydrophilic, while in other embodiments the polymer may be an amphiphilic copolymer comprising at least one hydrophobic portion and at least one hydrophilic portion. Hydrophilic polymers may include any array of heteroatoms that confer polarity to the polymer. Moreover, some such polymers may contain organic functional groups capable of supporting a formal charge, such as carboxylates, amines/ammonium groups, including mono alkyl ammonium, dialkyl ammonium, trialkylammonium, and tetraalkyl ammonium salts, sulfonates or alkyl sulfonates, phosphates or alkyl phosphates, or other charged functional groups. Examples of hydrophilic polymers may include, without limitation, polyethylene glycol (PEG), poly(vinyl alcohol), polyvinylpyrrolidone, chitosan, starch, sodium carboxymethylcellulose, cellulose, hydroxyethyl cellulose, sodium alginate, galactomannan, such as guar, scleroglucan, diutan, welan, gellan, xanthan, and carrageenan.

Other suitable hydrophilic polymers may include homopolymers, copolymers, or terpolymers including, without limitation, polyacrylamides, polyvinylamines, poly(vinylamines/vinyl alcohols), alkyl acrylate polymers, and combinations thereof. Additional examples of alkyl acrylate polymers may include polydimethylaminoethyl methacrylate, polydimethylaminopropyl methacrylamide, poly(acrylamide-dimethylaminoethyl methacrylate), poly(methacrylic acid-dimethylaminoethyl methacrylate), poly(2-acrylamido-2-methyl propane sulfonic acid/dimethylaminoethyl methacrylate), poly(acrylamide-dimethylaminopropyl methacrylamide), poly(acrylic acid/dimethylaminopropyl methacrylamide), poly(methacrylic acid-dimethylaminopropyl methacrylamide), and combinations thereof. In certain embodiments, the hydrophilic polymers may comprise a polymer backbone and reactive amino groups in the polymer backbone or as pendant groups, the reactive amino groups capable of engaging a zero-valent metal or metal ion ligand coordination sphere. In some embodiments, the hydrophilic polymers may comprise dialkyl amino pendant groups. In some embodiments, the hydrophilic polymers may comprise a dimethyl amino pendant group and a monomer comprising dimethylaminoethyl methacrylate or dimethylaminopropyl methacrylamide. In certain embodiments, the hydrophilic polymers may comprise a polymer backbone that comprises polar heteroatoms, wherein the polar heteroatoms present within the polymer backbone of the hydrophilic polymers include oxygen, nitrogen, sulfur, or phosphorous. Suitable hydrophilic polymers that comprise polar heteroatoms within the polymer backbone include, without limitation, homopolymer, copolymer, or terpolymers, such as, but not limited to, celluloses, chitosans, polyamides, polyetheramines, polyethyleneimines, polyhydroxyetheramines, polylysines, polysulfones, gums, starches, and combinations thereof. In some embodiments, the starch may be a cationic starch. A suitable cationic starch maybe formed by reacting a starch, such as corn, maize, waxy maize, potato, tapioca, or the like, with the reaction product of epichlorohydrin and trialkylamine.

In some embodiments, the polymer employed in methods of the invention may be a synthetic polymer or a naturally occurring polymer. In some embodiments, the polymer may be based on amino acids and maybe a protein. In some embodiments, the polymer may be based on polysaccharides or glycoproteins. In some embodiments, the polymer may be a PEG-based polymer. In some embodiments, the polymer may be selected to swell in polar solvent such as water. In some embodiments, the polymer may be selected to swell in a nonpolar solvent, such as a hydrocarbon based solvent like diesel. In some embodiments, the polymer may be selected to resist swelling regardless of what solvent is employed.

In some embodiments, smart polymers may be employed to allow a change in the polymers character, including, without limitation, polarity molecular weight, and degree of crosslinking. In some embodiments, the polymer may comprise a block copolymer. In some such embodiments, the block copolymer may be a diblock, triblock, tetrablock, or other multiblock copolymer. In some embodiments, the polymer may comprise a graft copolymer. In some embodiments, the polymer may be a periodic copolymer. In some embodiments, the polymer may be an alternating copolymer. In some embodiments, the polymer may be a random or interpolymer.

In some embodiments, the polymer may be selected to be degradable. Suitable examples of degradable polymers that may be used in accordance with the present invention include, but are not limited to, homopolymers, random, block, graft, and star- and hyper-branched aliphatic polyesters. Such suitable polymers may be prepared by polycondensation reactions, ring-opening polymerizations, free radical polymerizations, anionic polymerizations, carbocationic polymerizations, coordinative ring-opening polymerizations, as well as by any other suitable process.

Examples of suitable degradable polymers that may be used in conjunction with the methods of this invention include, but are not limited to, aliphatic polyesters; poly(lactides); poly(glycolides); poly(ε-caprolactones); poly(hydroxy ester ethers); poly(hydroxybutyrates); poly(anhydrides); polycarbonates; poly(orthoesters); poly(amino acids); poly(ethylene oxides); poly(phosphazenes); polyether esters, polyester amides, polyamides, and copolymers or blends of any of these degradable polymers, and derivatives of these degradable polymers. The term "copolymer" as used herein is not limited to the combination of two polymers, but includes any combination of polymers, e.g., terpolymers and the like.

As referred to herein, the term "derivative" is defined herein to include any compound that is made from one of the listed compounds, for example, by replacing one atom in the base compound with another atom or group of atoms. Of these suitable polymers, aliphatic polyesters such as poly (lactic acid), poly(an hydrides), poly(orthoesters), and poly (lactide)-co-poly(glycolide) copolymers maybe beneficially employed, especially poly(lactic acid) and poly(orthoesters). Other degradable polymers that are subject to hydrolytic degradation also may be suitable. One's choice may depend on the particular application or use and the conditions involved. Other guidelines to consider include the degradation products that result, the time for required for the requisite degree of degradation, and the desired result of the degradation, such as removal of the crosslinked gel after a fracturing operation.

Suitable aliphatic polyesters have the general formula of repeating units shown below:

Formula I where n is an integer between 75 and 10,000 and R is selected from the group consisting of hydrogen, alkyl, aryl, alkylaryl, acetyl, heteroatoms, and mixtures thereof. In certain embodiments of the present invention wherein an aliphatic polyester is used, the aliphatic polyester may be poly(lactide). Poly (lactide) is synthesized either from lactic acid by a condensation reaction or, more commonly, by ring-opening polymerization of cyclic lactide monomer. Since both lactic acid and lactide may achieve the same repeating unit, the general term poly(lactic acid) as used herein is included in Formula I without any limitation as to how the polymer was made (e.g., from lactides, lactic acid, or oligomers), and without reference to the degree of polymerization or level of plasticization.

The lactide monomer exists generally in three different forms: two stereoisomers (L- and D-lactide) and racemic D,L-lactide (/meso-lactide). The oligomers of lactic acid and the oligomers of lactide are defined by the formula:

Formula II where m is an integer in the range of from greater than or equal to about 2 to less than or equal to about 75. In certain embodiments, m may be an integer in the range of from greater than or equal to about 2 to less than or equal to about 10. These limits may correspond to number average molecular weights below about 5,400 and below about 720, respectively.

The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications or uses of the present invention in which a slower degradation of crosslinked gel is desired. Poly(D,L-lactide) may be a more amorphous polymer with a resultant faster hydrolysis rate. This may be suitable for other applications or uses in which a more rapid degradation may be appropriate. The stereoisomers of lactic acid may be used individually, or may be combined in accordance with the present invention. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers may be modified by blending high and low molecular weight polylactide or by blending polylactide with other polyesters, in embodiments wherein polylactide is used as the degradable material, certain preferred embodiments employ a mixture of the D and L stereoisomers, designed so as to provide a desired degradation time and/or rate. Examples of suitable sources of degradable material are poly(lactic acids) that are commercially available from NatureWorks® of Minnetonka, Minn., under the trade names "300 ID" and "4060D."

Aliphatic polyesters useful in the present invention may be prepared by substantially any of the conventionally known manufacturing methods such as those described in U.S. Pat. Nos. 6,323,307; 5,216,050; 4,387,769; 3,912,692; and 2,703,316, the entire disclosures of which are incorporated herein by reference.

Polyanhydrides are another type of degradable polymer that may be suitable for use in the present invention. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

The physical properties of degradable polymers may depend on several factors including, but not limited to, the composition of the repeat units, flexibility of the chain, presence of polar groups, molecular mass, degree of branching, crystallinity, and orientation. For example, short chain branches may reduce the degree of crystallinity of polymers while long chain branches may lower the melt viscosity and may impart, inter alia, extensional viscosity with tension-stiffening behavior. The properties of the material used further may be tailored by blending, and copolymerizing it with another polymer, or by a change in the macromolecular architecture (e.g., hyper-branched polymers, star-shaped, or dendrimers, and the like). The properties of any such suitable degradable polymers (e.g., hydrophobicity, hydrophilicity, rate of degradation, and the like) maybe tailored by introducing select functional groups along the polymer chains. For example, poly(phenyllactide) will degrade at about one-fifth of the rate of racemic poly(lactide) at a pH of 7.4 at 55° C. One of ordinary skill in the art, with the benefit of this disclosure, will be able to determine the appropriate functional groups to introduce to the polymer chains to achieve the desired physical properties of the degradable polymers.

Polymers employed in the present invention may vary in molecular weight and degree of cross-linking suitable for compatibility with the intended application as a crosslinker for a gelling agent. For example, the molecular weight of the polymer and its degree of cross-linking may be chosen for any number of physical properties such as swellability, stiffness, strength, and toughness. In some embodiments the polymer may be an oligomer or polymer comprising a molecular weight in a range from about 1,000 Daltons to about 10 MegaDaltons, including any value inbetween.

In some embodiments, compounds of Formula I may comprise a subgenus in which Ar is phenyl and $X^1$ (or $X^2$) is null and m is 2. Thus, in some embodiments, the present invention also provides compounds of Formula II:

wherein the variables $X^1$, L, $M^1$, Z, and n are defined as above, except that $X^1$ is not null.

In other embodiments, compounds of Formula I may comprise a subgenus in which Ar is phenyl, $X^1$ and $X^2$ are 0, and m is 1. Thus, in some embodiments, the present invention also provides compounds of Formula III:

wherein the variables L, $M^1$, Z, and n are defined as above.

The oligomers or polymers of Formulas I-III may be provided or used in any suitable form. For instance, they may be a liquid, a gel, an emulsion, or a solid. The form may depend on the specific choice of the oligomer or polymer (e.g., a structure corresponding to Formula I, II, or III). For example, in certain embodiments, oligomers or polymers of Formulas I-III may be added in a quantity beyond the solubility limit in an aqueous fluid and thus, not be in an aqueous form. In other embodiments, a oligomers or polymers of Formulas I-III may be dissolved, suspended, or emulsified in a liquid.

In other embodiments, oligomers or polymers of Formulas I-III may be used in a form that allows for a delayed release. A delayed release may be desirable when a subterranean operation involves high temperature conditions, and release of the of Formulas I-III may be desired after these high temperature conditions occur. For example, in wells with temperatures that employ a second crosslinker, the second crosslinker may be tailored to become available for crosslinking when a first crosslinker fails, e.g., at temperatures in which a conventional boron based crosslinker fails. A delayed release also may be desirable in a deep well or in a well requiring a long pump time. In certain embodiments, the oligomers or polymers of Formulas I-III may be encapsulated or enclosed within an outer coating that is capable of degrading at a desired time. Exemplary encapsulation methodologies are described in U.S. Pat. Nos. 5,373,901; 6,444,316; 6,527,051; and 6,554,071, the entire disclosures of which are incorporated herein by reference. The crosslinking of the fluid may also be delayed by preparing the fluid at low pH and adding an encapsulated pH-adjusting agent that can raise the pH of the treatment fluid for crosslinking. A person having ordinary skill in the art, with the benefit of this disclosure, will recognize the appropriate encapsulation or coating technique to use with the oligomers or polymers of Formulas I-III disclosed herein.

In certain embodiments in which the oligomers or polymers of Formulas I-III are encapsulated, the oligomers or polymers may comprise a coating or containment means, e.g., to delay the release of the oligomers or polymers of Formulas I-III. In general, suitable coating or containment means are degradable materials in which the products of the degradation do not adversely affect the oligomers or polymers of Formulas I-III. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. Examples of degradable materials that may be used as a coating or containment means in conjunction with the oligomers or polymers of Formulas I-III include, but are not limited to, polysaccharides, such as dextran or cellulose; chitins; chitosans; proteins; aliphatic polyesters; poly(lactides); poly (glycolides); poly(ϵ-caprolactones); poly(hydroxybutyrates); poly(anhydrides); aliphatic polycarbonates; ortho esters; poly(orthoesters); poly(amino acids); poly(ethylene oxides); and poly(phosphazenes). Other suitable degradable polymers include heat-sealable materials, other thermoplastic materials, or materials that may be dissolved with an appropriate solvent (e.g., hydroxypropylmethylcellulose, pectin, polyethylene oxide, polyvinyl alcohol, alginate, polycaprolactone, gelatinised starch-based materials, and the like). In certain exemplary embodiments, blends of these materials may be used.

The oligomers or polymers of Formulas I-III may be used to form a crosslinked gelling agent. Under appropriate conditions (e.g., pH and temperature), the oligomers or polymers of Formulas I-III may allow one or more crosslinks to form between at least two gelling agent molecules. In addition, in some embodiments, treatment fluids comprising oligomers or polymers of Formulas I-III may exhibit viscoelastic behavior and may be broken using a pH shift to a less basic environment and reversibly formed by changing the pH back to a more basic environment.

The oligomers or polymers of Formulas I-III may be used to crosslink gelling agent molecules to form a viscosified treatment fluid. The oligomers or polymers of Formulas I-III generally may be present in an amount sufficient to provide the desired degree of crosslinking between gelling agent molecules, or to generate the desired viscosity or viscoelastic properties for a particular treatment. In certain embodiments, the oligomers or polymers of Formulas I-III may be present in the treatment fluid in an amount in the range of from about 0.003% to about 5% by weight of the aqueous fluid therein. In some embodiments, the oligomers or polymers of Formulas I-III may be added in an amount ranging from about 0.05 pounds per 1,000 gallons of treatment fluid ("lb/Mgal") to about 85 lb/Mgal. In another embodiment, the oligomers or polymers of Formulas I-III may be added to the treatment fluid in an amount ranging from about 1.0 lb/Mgal to about 50 lb/Mgal. The amount of oligomers or polymers of Formulas I-III added to the treatment fluid may depend on the gelling agents used, the structure of the oligomers or polymers of Formulas I-III, the average molecular weight of the oligomers or polymers of Formulas I-III, the number of boronic functional groups within the oligomers or polymers of Formulas I-III, and the critical overlap concentration of the gelling agent or agents used in the treatment fluid, as described in more detail below.

The oligomers or polymers of Formulas I-III, in some embodiments, may allow for the formation of a viscosified treatment fluid with a treatment fluid comprising a gelling agent at a concentration below the critical overlap concentration. The critical overlap concentration (C*) of the gelling agent or agents used to form the viscosified treatment fluid may be described as that concentration necessary to cause polymer chain overlap, that is, the concentration above which the viscosity of a fluid containing the gelling agent is influenced not just by the weight percent of the individual gelling agent molecule strands, but also by the interaction of the individual strands with one another. The value of C* can be used to denote the minimum concentration of gelling agent needed for effective crosslinking with a traditional crosslinker. C* is a concentration value expressed in "true percent" that denotes the concentration of gelling agent needed for optimum viscosity formation. The value of C* may be determined by measuring the viscosity of several concentrations of the gelling agent in an aqueous solution. While C* is related to molecular weight, it is only directly related within the same polymer in the same solution environment having different molecular weights. By way of example, a galactomannan (such as guar) polymer having a molecular weight of 2,000,000 will likely have a different C* than a derivatized galactomannan polymer having the same molecular weight. Moreover, changing the environment can effect that C* of a polymer, for example, a galactomannan polymer having a molecular weight of 2,000,000 will exhibit one C* in fresh water, but a different C* when methanol or a salt is added to the water. One skilled in the art will recognize the effect that additives such as methanol and salt can have on C* based on the expanding and contracting effect they have on the polymer itself in the water. Without intending to be limited by theory, it is believed that the presence of certain multiple boronic functional groups may allow for oligomers or polymers of Formulas I-III molecules to span between polymer chains to allow the formation of a crosslinked treatment fluid when the treatment fluid comprises a gelling agent below its C* value. Such interactions may depend on the structure of the oligomers or polymers of Formulas I-III, the number of boronic functional groups included in the oligomers or polymers of Formulas I-III, and the average molecular weight of the oligomers or polymers of Formulas I-III. For example, the interactions are more likely to occur with a polymeric than a lower molecular weight oligomer.

A variety of gelling agents can be used in the treatment fluids of the present invention. Suitable gelling agents typically comprise biopolymers, synthetic polymers, or both. In certain embodiments, suitable gelling agents may comprise a plurality of hydroxyl functional groups oriented to allow binding to a boronic functional group (e.g., cis orientation, trans orientation, or the orientation of two hydroxyl groups on nearby molecules aligned to allow for the binding of a boronic functional group). Without wishing to be limited by any particular theory, it is believed that in certain embodiments, a boronic functional group present in oligomers or polymers of Formulas I-III may form a crosslink with the hydroxyl groups on a gelling agent molecule to form a viscosified treatment fluid. In some embodiments, the treatment fluid may exhibit viscoelastic properties. In certain embodiments, suitable gelling agents may be biopolymers comprising polysaccharides, and derivatives thereof, that have one or more of these monosaccharide units: galactose, mannose, glucoside, glucose, xylose, arabinose, fructose, glucuronic acid, or pyranosyl sulfate. Examples of suitable biopolymers include, but are not limited to, galactomannan (such as guar gum) and derivatives thereof, such as hydroxypropyl guar and carboxymethylhydroxypropyl guar, cellulose derivatives, such as hydroxyethyl cellulose, and xanthan and derivatives thereof. In some embodiments, the gelling agent (e.g., a biopolymer) may be depolymerized. The term "depolymerized," as used herein, generally refers to a decrease in the molecular weight of the gelling agent molecule. Depolymerized gelling agent molecules are described in U.S. Pat. No. 6,488,091, the entire disclosure of which is incorporated herein by reference.

In some embodiments, the gelling agent may comprise a water soluble synthetic polymer. Synthetic polymers can be prepared by any suitable monomers known in the art, including those useful for forming the oligomers or polymers of Formulas I-III. In some embodiments, suitable monomers useful in forming a synthetic polymer useful as a gelling agent can include, but are not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniummethyl methacrylate chloride, methacrylamide, hydroxyethyl acrylate, vinyl sulfonic acid, vinyl phosphonic acid, vinylbenzene sulfonic acid, methacrylic acid, vinyl caprolactam, N-vinylformamide, diallyl amine, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid, alkyl acrylates, alkyl methacrylates, alkyl acrylamides, alkyl methacrylamides alkyl dimethylammoniumethyl methacrylate halides, and alkyl dimethylammoniumpropyl methacrylamide halides. Examples of such synthetic polymers may include, but are not limited to, polyacrylate, polymethacrylate, polyacrylamide, polyvinyl alcohol, polyvinylpyrrolidone, and their copolymers. In some embodiments, the oligomers or polymers of Formulas I-III can themselves be considered gelling agents.

In some embodiments, a gelling agent may be present in the treatment fluids of the present invention in an amount in the range of from about 0.1% to about 10% by weight of the aqueous fluid therein. In certain exemplary embodiments, the gelling agent may be present in the treatment fluids of the present invention in an amount in the range of from about 0.1% to about 5% by weight of the aqueous fluid therein.

In some applications, after a treatment fluid has performed its desired function, its viscosity may be reduced and/or the crosslinked gel may be broken down. For example, in a subterranean application, once the viscosified treatment fluid's viscosity is reduced, it may be flowed back to the surface, and the well may be returned to production. Reducing the viscosity of a viscosified treatment fluid may occur by adjusting the pH of the treatment fluid so that crosslinks between gelling agent molecules become unstable or "delink." The terms "delink" or "delinking" refer to the reversible removal of crosslinks between at least two molecules that are crosslinked (e.g., crosslinked gelling agent molecules). Delinking also may occur, independent of pH, through the addition of a compound capable of removing and/or sequestering the metal associated with the crosslink. Such delinking is described in U.S. Pat. No. 7,000,702, the entire disclosure of which is incorporated herein by reference. Viscosity reduction may also be achieved by degradation of the polymer comprising monomer unit $M^1$, as described herein above.

Although the crosslinked gelling agent molecules crosslinked with the oligomers or polymers of Formulas I-III may be capable of delinking based on pH, any breaker may be used with the viscosified treatment fluids of the present invention. The term "breaker" refers to an agent that is capable of reducing the viscosity of a treatment fluid. For example, any breaker that is an acid, oxidizer, or enzyme known in the art may be used with the treatment fluids of the present invention. Suitable acid breakers can include mineral acids such as hydrochloric acid, sulfuric acid, or nitric acid. Suitable oxidizers can include, but are not limited to, persulfates, peroxides, and hypochlorites. In some embodiments, the breaker may be a delayed breaker such as a delayed release acid capable of lowering the pH of the treating fluid. Examples of delayed breakers which may be used include, but are not limited to, various lactones, esters, encapsulated acids and slowly soluble acid generating compounds, oxidizers which produce acids upon reaction with water, water reactive metals such as aluminum, lithium and magnesium and the like. The breaker may be included in the treatment fluid in an amount in the range of from about 0% to about 1% by weight of the aqueous fluid therein. Enzyme breakers capable of generating acids may also be employed including alpha and beta amylases, amyloglucosidase, invertase, maltase, cellulase and hemi-cellulase. The specific delayed breaker used, whether or not it is encapsulated, as well as the amount thereof employed will depend upon the breaking time desired, the nature of the gelling agent and the oligomers or polymers of Formulas I-III, formation characteristics and conditions and other factors.

The treatment fluids of the present invention also may comprise pH-adjusting agents. The pH-adjusting agents may be included in the viscosified treatment fluid to adjust the pH of the viscosified treatment fluid, inter alia, to facilitate the formation or delinking of crosslinks between gelling agent molecules. In some embodiments, oligomers or polymers of Formulas I-III may not be capable of forming crosslinks between gelling agent molecules in acidic environments at or below a pH ranging from about 2.0 to 7.5. Therefore, crosslinking or delinking may occur by adjusting the pH of the treatment fluid once it is placed in a desired location, e.g., in a subterranean well bore, or at the end of a subterranean operation. In certain embodiments in which the pH is to be increased (e.g., to facilitate crosslinking), suitable pH-adjusting agents may comprise a base. Examples of suitable bases include, but are not limited to, sodium hydroxide, potassium hydroxide, lithium hydroxide, sodium carbonate, potassium carbonate, ammonium hydroxide or a combination thereof. In other embodiments in which the pH is to be decreased (e.g., to facilitate delinking crosslinks), suitable pH-adjusting agents include, but are not limited to, fumaric acid, formic acid, acetic acid, acetic anhydride, hydrochloric acid, hydrofluoric acid, hydroxyfluoroboric acid, polyaspartic acid, polysuccinimide, or a combination thereof. The appropriate pH-adjusting agent and amount thereof used may depend on the formation characteristics and conditions, on the breaking or crosslinking time desired, on the nature of the oligomers or polymers of Formulas I-III used, and on other factors known to individuals skilled in the art with the benefit of this disclosure.

In some embodiments, the oligomers or polymers of Formulas I-III may be crosslinked at a lower pH by inserting a electron withdrawing group (Z) in the oligomers or polymers of Formulas I-III so that $pK_a$ of a boronic acid group can be lowered. In some such embodiments, the treatment fluid may be crosslinked at a pH ranging from about 5 to about 8.

In addition, the treatment fluids of the present invention may further comprise a buffer. Buffers may be used to maintain a treatment fluid's pH in a limited range. Examples of suitable buffers include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, and the like. When used, the buffer may be included in an amount sufficient to maintain the pH of such viscosified treatment fluids at a desired level. In an embodiment, a buffer may be included in an amount of from about 0.5% to about 10% by weight of the aqueous fluid therein. One of ordinary skill in the art, with the benefit of this disclosure, will recognize the appropriate buffer and amount of the buffer to use for a chosen application.

The treatment fluids of the present invention optionally may comprise particulates, such as proppant particulates or gravel particulates. Particulates suitable for use in the present invention may comprise any material suitable for use in subterranean operations. Suitable materials for these particulates include, but are not limited to, sand, bauxite, ceramic materials, glass materials, polymer materials, polytetrafluoroethylene materials (such as Teflon®, commercially available from DuPont), nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The particulate size generally may range from about 2 mesh to about 400 mesh on the U.S. Sieve Series; however, in certain circumstances, other sizes may be desired and will be entirely suitable for practice of the present invention. In some embodiments, particulate size distribution ranges may be one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In some embodiments, the particulates included in the treatment fluids of the present invention may be coated with any suitable resin or tackifying agent known to those of ordinary skill in the art. In some embodiments, the particulates may be present in the treatment fluids of the present invention in an amount in the range of from about 0.5 pounds per gallon ("ppg") to about 30 ppg by volume of the treatment fluid.

Additional additives may be added to the treatment fluids of the present invention as deemed appropriate by one skilled in the art with the benefit of this disclosure. Examples of such additives include, but are not limited to, fluid loss control agents, surfactants, dispersing agents, weighting agents, scale inhibitors, clay stabilizers, silicate-control agents, antifoaming agents, foaming agents, biocides, biostatic agents, storage stabilizers, and combinations thereof.

The treatment fluids of the present invention can be used for carrying out a variety of subterranean well treatments, including, but not limited to, fracturing and gravel packing subterranean formations. In some embodiments in which the treatment fluids of the present invention are used in conjunction with fracturing operations, fracturing fluids comprising an aqueous fluid, a gelling agent and oligomers or polymers of Formulas I-III, may be placed in a subterranean formation so as to create or enhance one or more fractures therein. After the fracturing fluid has performed its desired function, or after a desired time, the viscosity of the fracturing fluid may be reduced and the fluid recovered.

In some embodiments, a method of fracturing a subterranean formation may comprise providing a treatment fluid comprising: an aqueous fluid; a gelling agent; and oligomers or polymers of Formulas I-III; introducing the treatment fluid into a subterranean formation at a pressure sufficient to create or enhance at least one fracture within the subterranean formation. In some such embodiments, the treatment fluid may be further contacted with a breaker, and the viscosity of the treatment fluid may be allowed to decrease. The treatment fluid may then be re-crosslinked to increase the viscosity of the treatment fluid as desired.

In various methods disclosed herein, including fracturing operations, the gelling agent and the polymer may crosslink to form a gel that is stable at a pH in a range from about 6 to about 8 at temperatures in a range from about ambient temperature to about 125° C. In other embodiments, the gelling agent and the polymer may crosslink to form a gel that is stable at a pH in a range from about 9 to about 11, +/− about 0.5 pH, at temperatures in a range from about 200° C. to about 275° C. In still further embodiments, the gelling agent and the polymer may crosslink to form a gel that is stable at a pH of about 11 at temperatures in a range from about 275° C. to about 300° C. Without being bound by theory, it has been indicated that the presence of electron withdrawing groups Z confers temperature stability to the crosslinked gelling agents when employing oligomers or polymers of Formulas I-III as crosslinkers.

The present invention also provides methods of reusing treatment fluids or any component, or combination of components, therein. In general, the treatment fluids of the present invention can be reused because gelling agents crosslinked using the oligomers or polymers of Formulas I-III may be delinked. In some embodiments, reuse of the treatment fluids of the present invention involves delinking the crosslinked gelling agents to a sufficient degree so as to remove the crosslinks to at least one gelling agent molecule thereby forming a "delinked gelling agent." These delinked gelling agents may then be crosslinked, e.g., to increase the viscosity of the same or a different treatment fluid. In some embodiments, one or more components of a treatment fluid comprising delinked gelling agents may be reused. For example, the gelling agent or the water of a viscosified treatment fluid may be reused. Reusing treatment fluids is described U.S. Pat. No. 7,082,995, the entire disclosure of which is incorporated herein by reference.

In some embodiments, a method of treating a subterranean formation comprises providing a treatment fluid comprising an aqueous fluid, a gelling agent, and oligomers or polymers of Formulas I-III; and introducing the treatment fluid into a subterranean formation. In some embodiments, the treatment fluid may be contacted with a breaker, and the viscosity of the treatment fluid may be allowed to decrease. The treatment fluid may then be re-crosslinked to increase the viscosity of the treatment fluid as desired.

To facilitate a better understanding of the present invention, the following examples of preferred or representative embodiments are given. In no way should the following examples be read to limit, or to define, the scope of the invention.

EXAMPLE

It has been indicated that lower $pK_a$ for boronic acid derivatives correlate with a lowering of the pH necessary to bind sugar molecules. In accordance with embodiments of the invention, in polymeric boronic acid derivatives, the stability of the network can be increased by modifying the electron characteristics of the crosslinking monomer. The use of a boron based crosslinker which can bind a gelling agent, such as guar, at a lower pH, may render a high pH where the monomer may hydrolyze is unnecessary, and more binding can be achieved at lower pH.

Table I below shows some representative examples along with Mulliken charges calculated using DFT and Materials Studio 5.0 in a water solvation model. The Mulliken charge may correlate with the $pK_a$ in these systems. This example shows that the charge density can be increased via certain functional groups in the monomers for both the borate and free boronic acid.

TABLE I

Boron Mulliken Charge Densities

TABLE I-continued

Boron Mulliken Charge Densities

TABLE I-continued

Boron Mulliken Charge Densities

| Structure | Δ | Structure |
|---|---|---|
| benzodioxaborole-isobutyramide, 0.477 | Δ 0.037 | Na salt, 0.440 |
| (HO)₂B, 4-NO₂-phenyl-isobutyramide, 0.366 | Δ 0.049 | Na(HO)₃B analog, 0.317 |
| (HO)₂B, N-acetyl-N-isobutyryl-4-NO₂-aniline, 0.370 | Δ 0.044 | Na(HO)₃B analog, 0.326 |
| (HO)₂B, 3-NO₂ isomer, 0.323 | Δ 0.030 | Na(HO)₃B analog, 0.293 |
| nitro-benzodioxaborole-isobutyramide, 0.482 | Δ 0.041 | Na salt, 0.441 |

TABLE I-continued

Boron Mulliken Charge Densities

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing a treatment fluid that comprises:
   an aqueous base fluid;
   a gelling agent; and
   an oligomer or polymer comprising:
   a monomer unit $M^1$ comprising a boronic acid; and
   an optional comonomer;

wherein the boronic acid comprises a structure of Formula I:

Formula I wherein $X^1$ and $X^2$ are independently selected from the group consisting of O, $CH_2$, $CH_2O$, $OCH_2$, and bond;

$Y^1$ and $Y^2$ are independently N or C;

Ar is a 5- or 6-membered ring aryl or heteroaryl group with a link L to monomer unit $M^1$;

m is 1 or 2;

n is 0, 1, 2, or 3; and each incidence of Z is independently an electron withdrawing group selected from the group consisting of nitro, ester, carboxylic acids, carboxylates, halogen, cyano, amide, acyl, alkylsulfonyl, arylsulfonyl, heteroarylsulfonyl, $CF_3$, a quaternary ammonium salt, polyhaloalkyl, and carbamate;

with the proviso that when n is 0, the link L between $M^1$ and Ar comprises an electron withdrawing group attached to Ar; and introducing the treatment fluid into a subterranean formation.

2. The method of claim 1, wherein the polymer comprises one selected from the group consisting of a block copolymer, a homopolymer, and a random copolymer.

3. The method of claim 1, wherein the oligomer or polymer comprises a molecular weight in a range from about 1,000 Daltons to about 10 MegaDaltons.

4. The method of claim 1, wherein the gelling agent comprises a polymer comprising a plurality of hydroxyl functional groups.

5. The method of claim 4, wherein the gelling agent comprises an oligomer or polymer selected from the group consisting of a polysaccharide, a galactomannan, hydroxypropyl guar, carboxymethylhydroxypropyl guar, a polyvinyl alcohol, a cellulose, a xanthan, a diutan hydroxyethyl cellulose, carboxymethyl cellulose, carboxyethyl cellulose, and derivative thereof, and any combination thereof.

6. The method of claim 5, wherein the gelling agent comprises guar.

7. The method of claim 1, wherein the gelling agent and the polymer crosslink to form a gel that is stable at a pH in a range from about 6 to about 8 at temperatures in a range from about ambient temperature to about 125° C.

8. The method of claim 1, wherein the gelling agent and the polymer crosslink to form a gel that is stable at a pH in a range from about 9 to about 11 at temperatures in a range from about 200° C. to about 275° C.

9. The method of claim 1, wherein the gelling agent and the polymer crosslink to form a gel that is stable at a pH of about 11 at temperatures in a range from about 275° C. to about 300° C.

10. A method comprising:
providing a treatment fluid that comprises:
an aqueous base fluid;
a gelling agent;
a polymer comprising:
a monomer unit $M^1$ comprising a boronic acid; and
an optional comonomer;
wherein the boronic acid comprises a structure of Formula I:

Formula I wherein $X^1$ and $X^2$ are independently selected from the group consisting of O, $CH_2$, $CH_2O$, $OCH_2$, and bond;
$Y^1$ and $Y^2$ are independently N or C;
Ar is a 5- or 6-membered ring aryl or heteroaryl group with a link L to monomer unit $M^1$;
m is 1 or 2;
n is 0, 1, 2, or 3; and
each incidence of Z is independently an electron withdrawing group selected from the group consisting of nitro, ester, carboxylic acids, carboxylates, halogen, cyano, amide, acyl, alkylsulfonyl, arylsulfonyl, heteroarylsulfonyl, $CF_3$, a quaternary ammonium salt, polyhaloalkyl, and carbamate;
with the proviso that when n is 0, the link L between $M^1$ and Ar comprises an electron withdrawing group attached to Ar; and
introducing the treatment fluid into a subterranean formation at a pressure sufficient to create or enhance at least one fracture therein.

11. The method of claim 10, wherein Ar is phenyl and $X^1$ or $X^2$ is null and m is 2.

12. The method of claim 10, wherein the polymer comprises one selected from the group consisting of a block copolymer, a homopolymer, and a random copolymer.

13. The method of claim 10, wherein the gelling agent comprises a polymer selected from the group consisting of a polysaccharide, a guar, hydroxypropyl guar, carboxymethylhydroxypropyl guar, a polyvinyl alcohol, a cellulose, a xanthan, hydroxyethyl cellulose, carboxymethyl cellulose, carboxyethyl cellulose, and derivative thereof, and any combination thereof.

14. The method of claim 10, wherein the gelling agent comprises guar.

15. The method of claim 10, wherein the gelling agent and the polymer crosslink to form a gel that is stable at a pH in a range from about 7 to about 8 at temperatures in a range from about ambient temperature to about 125° C.

16. The method of claim 10, wherein the gelling agent and the polymer crosslink to form a gel that is stable at a pH in a range from about 9.75 to about 11 at temperatures in a range from about 200° C. to about 275° C.

17. The method of claim 10, wherein the gelling agent and the polymer crosslink to form a gel that is stable at a pH of about 11 at temperatures in a range from about 275° C. to about 300° C.

* * * * *